Dec. 22, 1959  C. PLANTAS  2,918,291
TOOLHOLDER ADAPTER
Filed July 23, 1958
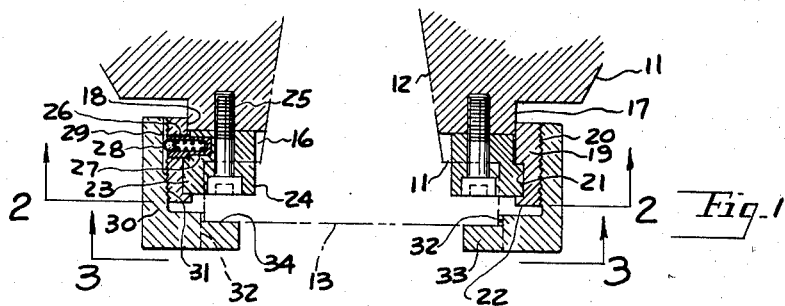
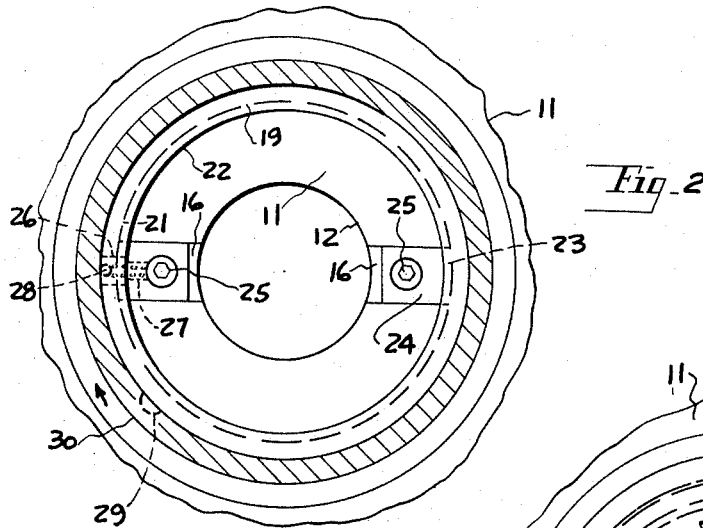
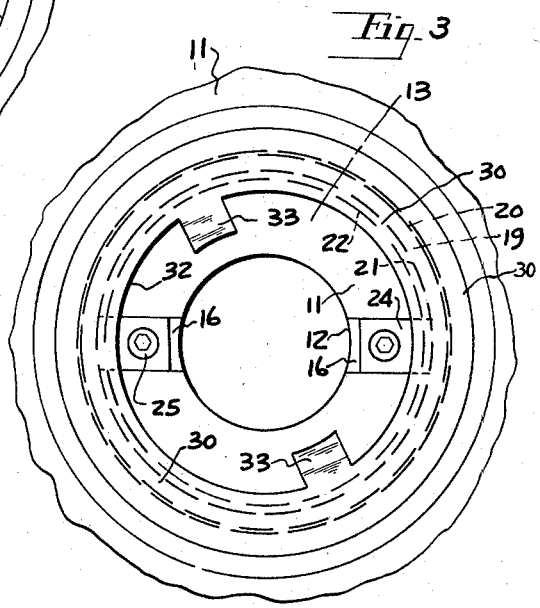
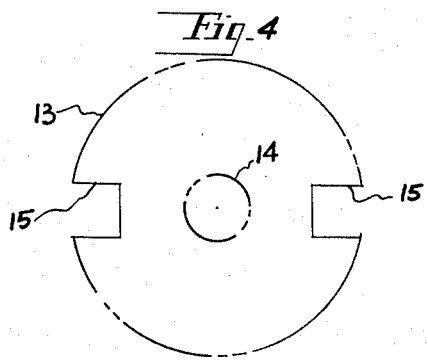
INVENTOR.
CHARLES PLANTAS
BY
Robert A. Sloman
ATTORNEY

United States Patent Office 2,918,291
Patented Dec. 22, 1959

2,918,291

TOOLHOLDER ADAPTER

Charles Plantas, Dearborn, Mich.

Application July 23, 1958, Serial No. 750,342

5 Claims. (Cl. 279—102)

This invention relates to a toolholder adapter for a machine tool, and more particularly to an adapter which facilitates the easy assembly and quick change or interchange of a tool from the rotatable spindle of a machine tool.

Heretofor the locking mechanism for securing a toolholder within the spindle of a machine tool required considerable effort and time in making the initial installation or in replacing the toolholder.

It is the object of the present invention to provide a simplified toolholder adapter upon said spindle by which a toolholder may be easily and quickly assembled within said spindle which may be easily and quickly removed and interchanged as desired.

It is the further object to provide a toolholder adapter for the power operated spindle of a machine tool whereby upon a slight rotary adjustment of the lock-up ring the toolholder may be easily and quickly removed and replaced.

These and other objects will be seen from the following specification and claims in conjunction with the appended drawing in which:

Fig. 1 is a fragmentary elevational section of the outer end of a machine tool spindle with the present toolholder adapter mounted thereon.

Fig. 2 is a section taken on line 2—2 of Fig. 1, but with the lock-up ring in release position.

Fig. 3 is a section taken on line 3—3 of Fig. 1, indicating the locking position of the lock-up ring.

Fig. 4 is an end view of the toolholder or milling arbor shown in dotted lines in Fig. 1.

It will be understood that the above drawing illustrates merely a preferred embodiment of the invention and that other embodiments are contemplated within the scope of the claims hereafter set forth.

Referring to the drawing, Fig. 1 fragmentarily shows the lower end of a conventional power rotated spindle 11 having an internal axially tapered bore 12 adapted to cooperatively receive in driving relation a conventional toolholder or milling arbor 13 shown in dotted lines, and further illustrated in the end view of Fig. 4.

Said toolholder has an axial bore 14 for securing therein a conventional tool, cutter or mill, and formed through opposite sides of the enlarged head of said holder are a pair of outwardly opening diametrically opposed slots 15 of rectangular shape.

A similar pair of diametrically opposed slots 16 are formed through the outer end of the cylindrical shank 17 on spindle 11 and are adapted to cooperatively receive therein the similarly shaped keys 24 secured to the end of said spindle by socket headed screws 25.

Thread ring 19 has an internal bore 18 by which said ring is slidably mounted over and around shank 17, said ring being exteriorly threaded at 20. Ring 19 has formed upon its interior the annular undercut slot 21 defining at its upper end a retaining shoulder and at its lower end the annular flange 22, Fig. 1.

Keys 24 have outwardly extending radial projections 23 adapted to nest within slot 21 in ring 19 and are projected upwardly of Fig. 1 into spindle slots 16. Upon tightening of screws 25 an effective means is provided of tightly securing thread ring 19 upon spindle shank 17.

Ring 19 has a threaded radial bore upon one side adapted to threadedly receive ball detent housing 26. Said housing has a shank at one end of reduced diameter at 27, which is snugly positioned within a corresponding radial slot in one of the keys 24.

Said housing has a conventional longitudinal bore for housing the spring biased ball detent 28 which is adapted to project outwardly of detent housing 26 and into the longitudinal slot 29 upon the interior surface of lock-up ring 30, when said lock-up ring is rotated to the locking position of Fig. 3. The slot 29 shown in Fig. 1 for convenience of illustration, actually is located as in Fig. 2 when ring 30 is in unlocked position.

Said lock-up ring is internally threaded at 31 and is adapted for threaded engagement and mounting over thread ring 19 and upon rotation is adapted for longitudinal adjustment thereon. Ring 30 at its outer end has an axial aperture 32 of slightly larger diameter than the diameter of the enlarged head of tool holder 13 in order to slidably receive the same for insertion within the tapered bore 12 of spindle 11.

Lock-up ring 30 within its central aperture 32 has a pair of radial inwardly directed opposed retainers 33, preferably of rectangular shape, whose interior top surfaces 34 are adapted to cooperatively, supportingly and retainingly engage the outer end face of toolholder 13 for effectively securing said toolholder within spindle 11.

In operation with the parts assembled in Fig. 1, lock-up ring 30 is substantially in the position shown so that retainers 33 are in registry with keys 24. This permits longitudinal insertion of the milling arbor or toolholder 13 up through lock-up ring 30 so that keys 24 partially project within the radial retainer slots 15 of the toolholder for establishing a driving relation between spindle 11 and said toolholder.

As a next step lock-up ring 30 is manually rotated a short distance, as for example 45-degrees, or in other pre-determined short arc, such as will project retainer surfaces 34 snugly and tightly against the end of toolholder 13 for securing the same within spindle bore 12. With retainers 33 so angularly displaced from toolholder slots 15, it is impossible for said toolholder to drop out.

In the preferred embodiment of the invention the longitudinal groove 29 in lock-up ring 30 is so angularly related with respect to retainers 33 that upon such rotary adjustment, of 45-degrees for example, the spring biased ball detent 28 will snap into registry with slot 29, shown in Fig. 2.

The present invention contemplates that the lock-up ring 30, have only such slight rotary movement as will effect longitudinal retaining engagement of retainers 33 with respect to the milling arbor or toolholder 13.

The advantage of the ball detent is to provide a convenient indicating means for the operator limiting his rotary adjustment of ring 30. At the same time ball detent 28 prevents accidental unthreading of said lock-up ring.

In the assembly shown in Fig. 1, the conventional powerdrive to spindle 11 is transmitted through keys 24 to toolholder 13 and does not effect the mounting of thread ring 19 or lock-up ring 30.

Having described my invention, reference should now be had to the following claims.

I claim:

1. A toolholder adapter for a machine tool having a power rotated spindle apertured to receive a toolholder, a cylindrical shank on said spindle having a pair of diametrically opposed radial slots in its outer end, a thread ring slidably mounted around said shank and exteriorly threaded, a key secured in each slot supportably retaining said ring on said shank, a lock-up ring threaded upon and movable longitudinally of said thread ring and having a central opening adapted to loosely receive said toolholder, and a pair of radial inwardly directed opposed retainers on said lock-up ring extending into said central opening adapted on partial rotation to supportably engage and axially retain said toolholder within said spindle.

2. The toolholder adapter of claim 1, said toolholder having a pair of diametrically opposed radial slots opening outwardly adapted to clear said retainers on axial assembly into said spindle, and further adapted to cooperatively receive said keys in driven relation.

3. The toolholder adapter of claim 1, said ring having an internal undercut slot defining a support shoulder, said keys having radial projections nested in said slot cooperable with said shoulder.

4. The toolholder adapter of claim 1, a spring biased ball detent mounted radially through said thread ring, there being a longitudinal internal groove in said lockup ring angularly displaced from said detent when said retainers are in registry with said keys and adapted to cooperatively receive said detent on rotation of said lock-up ring.

5. The toolholder adapter of claim 1, a spring biased ball detent mounted radially through said thread ring, there being a longitudinal internal groove in said lock-up ring, angularly displaced from said detent when said retainers are in registry with said keys and adapted to cooperatively receive said detent on rotation of said lock-up ring, said ball detent including a housing threaded within and through said thread ring and retainingly nested in an opening in one of said keys.

References Cited in the file of this patent
UNITED STATES PATENTS

| | | |
|---|---|---|
| 2,579,082 | Kramer | Dec. 18, 1951 |
| 2,719,722 | Nickless | Oct. 4, 1955 |
| 2,727,748 | Benjamin | Dec. 20, 1955 |